July 10, 1956  W. E. HEDLUND ET AL  2,754,103
ENSILAGE LOOSENER
Filed May 15, 1952  2 Sheets-Sheet 1

INVENTORS
WILFRED E. HEDLUND
MARTIN R. HEDLUND
JUNIOR M. HEDLUND
BY Williamson, Williamson, Schroeder & Adams
ATTORNEYS

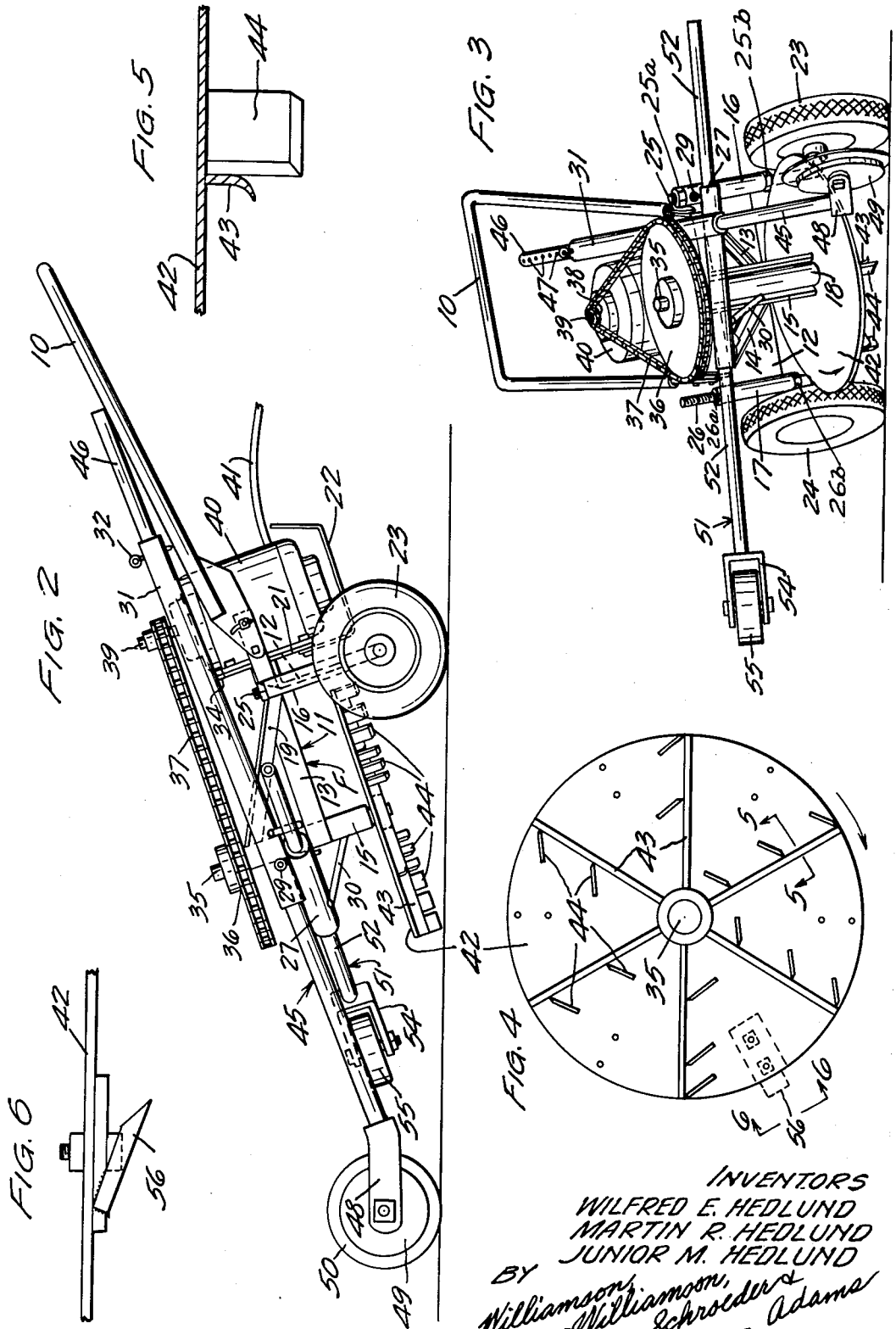

2,754,103

ENSILAGE LOOSENER

Wilfred E. Hedlund, Martin R. Hedlund, and Junior M. Hedlund, Boyceville, Wis.

Application May 15, 1952, Serial No. 287,988

4 Claims. (Cl. 262—19)

This invention relates to ensilage looseners. More particularly, it relates to devices or machines for loosening the frozen ensilage layer which forms across the top surface of the ensilage in a silo and also the frozen layer which forms in vertical rows or rings about the inner walls of the silo and adheres to these inner walls with great tenacity.

In the winter, farmers, and dairy farmers in particular, are confronted with the need for quickly and efficiently loosening prior to removal of ensilage from the silo the layer of ensilage which freezes to considerable depth over a period of only a few days and even to an appreciable depth over-night. In addition, the ensilage adjacent the inner walls of the silo freezes to these walls and adheres thereto very tightly so that frequently it is impossible to remove the same with a fork and as a result a row or ring of frozen ensilage accumulates along these inner walls above the general level of the ensilage. Our invention is directed toward providing a device for eliminating this problem.

It is a general object of our invention to provide a novel and improved ensilage loosener of cheap and simple construction and operation.

A more specific object is to provide a novel and improved ensilage loosener which may be cheaply manufactured, which requires a minimum of power, and which will quickly and efficiently loosen the frozen ensilage whether in the central portions of the silo or frozen in an upstanding ring around the inner side walls thereof.

Another object is to provide an ensilage loosener, the loosening elements of which are so oriented during rotation as to keep themselves free of ensilage throughout most of their orbit and thus require substantially less power for operation.

Another object is to provide an ensilage loosener readily adjustable to insure that the path of movement thereof will describe an arc concentric with the inner walls of the silo regardless of the diameter of the silo.

Another object is to provide an ensilage loosener having mechanism capable of adjustment to take a layer of ensilage of any desired thickness and loosen the same and at the same time positively prevent lateral slipping of the device.

Another object is to provide an ensilage loosener which will simultaneously loosen ensilage and move the loosened ensilage inwardly or centrally of the silo.

Another object is to provide an ensilage loosener capable of adjustment whereby a swath of ensilage of a predetermined width in a continuous arc about the center of the silo will be loosened, this arc being described at any selected radius relative to the center of the silo.

These and other objects and advantages of our invention will more fully appear from the following description made in connection with the accompanying drawings, wherein like reference characters refer to the same or similar parts throughout the several views, and in which:

Fig. 2 is a side elevational view of the loosener with the rotary disc of its scarifier assembly having its axis of rotation extending in a vertical plane;

Fig. 3 is a front elevational view of the device with its disc having its axis of rotation extended in a non-vertical plane as is normally the case with the device in operation;

Fig. 4 is a bottom plan view on an enlarged scale of the rotary disc showing the relative positions of the scarifier elements and the carrier elements and also showing mounted thereon for the sake of illustration the particular type of scarifier element utilized when loosening an upstanding ring of frozen ensilage within the silo;

Fig. 5 is a fragmentary sectional view on an enlarged scale taken along approximately line 5—5 of Fig. 4; and Fig. 6 is a fragmentary detailed view on an enlarged scale taken along line 6—6 of Fig. 4.

Figure 1:
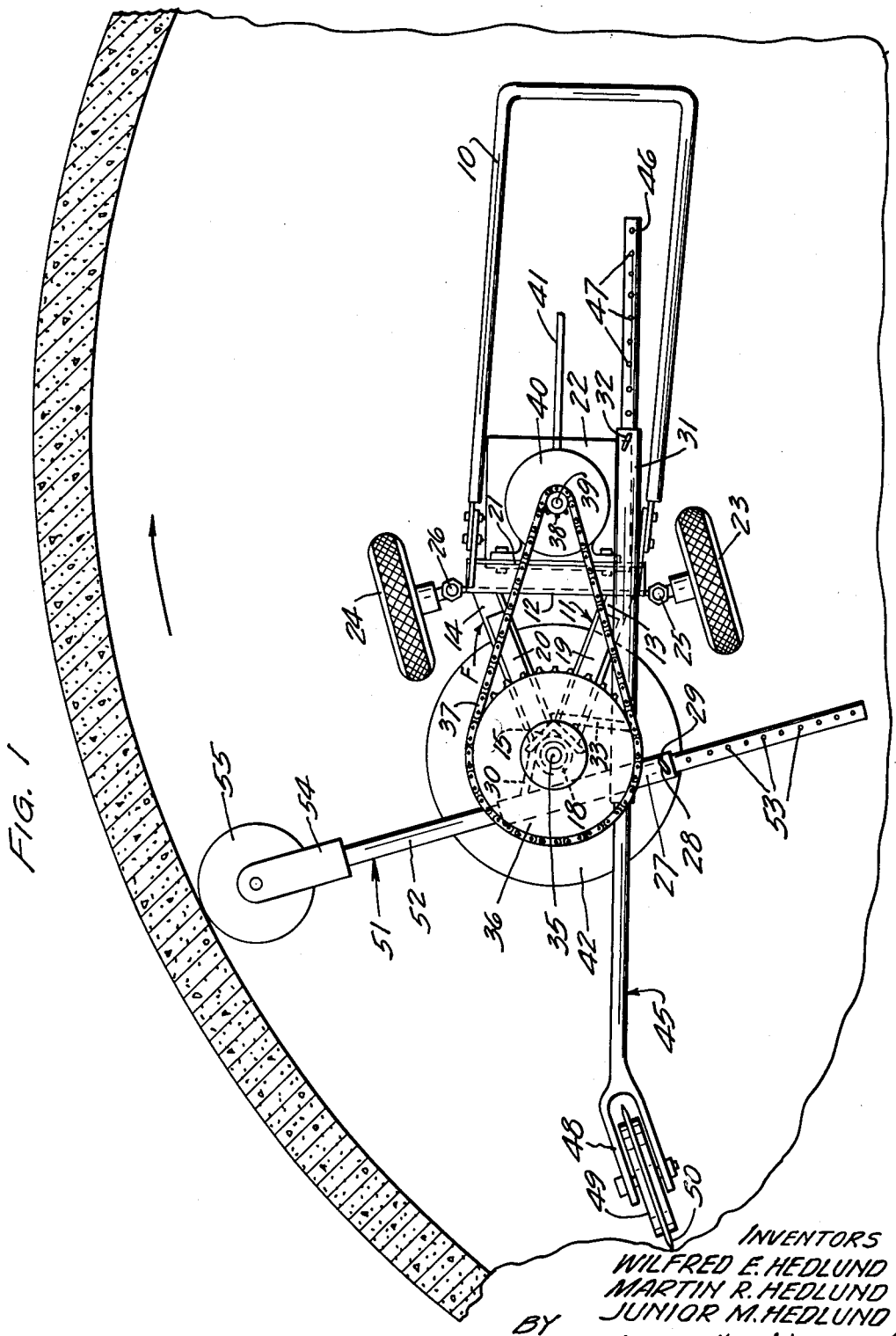
Fig. 1 is a plan view of one embodiment of our invention in position for operation within a silo.

One embodiment of our invention may include, as shown in Figs. 1–6, a frame indicated generally as F having a U-shaped member 10 connected thereto to provide handles therefor. The frame F is comprised of an A-frame 11 having a base leg 12 and a pair of side legs 13 and 14. At the apex of the A-frame 11 where the two side legs 13 and 14 meet is welded a vertically extending angle iron 15. Secured to the A-frame to each end of the base leg 12 is a vertically extending sleeve 16 and 17. A third upright sleeve 18 is secured within the angle iron 15 as best shown in Fig. 1. A pair of diagonally extending support members 19 and 20 extend between the upper end portions of the angle iron 15 and the side legs 13 and 14 to provide rigidity for the sleeve 18. Secured to the base leg 12 is a mounting plate 21 which extends in upright position and carries a guard plate 22 at its lower end.

The frame F is made ambulant by a pair of wheels 23 and 24 mounted upon axles which have their inner end portions angled upwardly to provide upstanding pivot posts 25 and 26. These pivot posts are externally threaded throughout the major portion of their length to carry nuts 25a, 25b and 26a, 26b above and below the end portions of the sleeves 16 and 17 through which the pivot posts extend, as shown in Fig. 3. In this manner each of the wheels 23 and 24 can be adjusted so as to describe an arc of any desired radius since they may be turned relative to the longitudinal center of the device as desired. Also, the entire device may be tilted to the right or left of its longitudinal center by varying the extent to which the pivot posts 25 and 26 extend through its sleeves 16 and 17 respectively. This may best be seen in Fig. 3 wherein the pivot post 25 is shown adjusted to cause the entire machine to tilt toward the left as viewed for a purpose to be hereinafter described.

Mounted upon the frame F and supported by the A-frame 11 is a transversely extending sleeve 27, this sleeve having an aperture 28 carrying a lock pin 29 adjacent one of its end portions. As best shown in Fig. 1 this transverse sleeve 27 is supported from the A-frame 11 by a bracket 30.

Also mounted on the A-frame by welding or the like is a longitudinally extending sleeve 31 having an aperture adjacent one of its end portions to carry a lock pin 32. This sleeve 31 is carried by a bracket 33 and is connected to the frame as at 34 to provide adequate support therefor.

Journaled in the sleeve 18 is an upright shaft 35 which carries at its one end a gear 36 driven by a roller chain 37 from a small gear 38 which is mounted upon the drive shaft 39 of an electric motor 40. As best shown in Fig. 2, this motor 40 is rigidly mounted upon the mounting plate 21 in upright position and is connectable with a source of electricity by an electric cord 41. A guard (not shown) is provided to cover the shaft 35, the gear 36, the chain 37 and the gear 39 to preclude injury to the operator by entanglement.

Mounted on the lower end portion of the shaft 35 for rotation therewith is a disc 42, this disc having a plurality of radially extending carrier elements 43 having a cross section as best shown in Fig. 5. Mounted upon the underside of the disc 42 directly behind the carrier elements 43 are a plurality of scarifier elements or cutting knives 44. As best shown in Fig. 5, these cutting knives 44 extend downwardly a distance substantially greater than the carrier elements 43 and as best shown in Fig. 4 are spaced radially and are angled outwardly at an acute angle to a radius of the disc so as to urge the ensilage engaged thereby inwardly during rotation. Each of the cutter knives 44 is so disposed relative to the cutter knive which precedes it in its arc of rotation as to be positioned slightly inwardly relative to the radius of the disc. In other words, each cutter knive is positioned closer to the center of the disc than the cutter knive which immediately precedes it during its rotation so that the paths of the various cutter knives are not the same during rotation of the disc.

Mounted within the longitudinally extending sleeve 31 is a guide element indicated generally as 45 which also acts as a stabilizer for the entire device. This guide element 45 is comprised of a shank 46 having a plurality of adjustment apertures 47 formed therein and being bifurcated at its opposite end portion as at 48 to carry a wheel 49 in free rotating relation. As best shown in Fig. 1 the wheel 49 has an outwardly extending circumferential flange 50 which is sharpened and disposed centrally of the circumferential surface of the wheel. The shank 46 is carried by the sleeve 31 in free sliding relation except when the lock pin 32 is utilized to extend through the adjustment apertures 47 to lock the shank relative to the sleeve. As best shown in Fig. 1, the bifurcated portion of the shank 46 extends at an angle to the length of the shank.

Mounted within the transversely extending sleeve 27 is a spacer element 51 which is comprised of a shank 52 having adjustment apertures 53 adjacent one of its end portions and being bifurcated at its other end portion as at 54 to carry a roller 55 in free rotating relation. The shank 52 is carried in free sliding relation to the sleeve 27 except when the lock pin 29 is inserted through one of the adjustment apertures 53 to lock the spacer element relative to the device.

As best shown in Fig. 4 an auxiliary knife 56 is provided for use with the disc 42 when it is desired to loosen frozen ensilage which has formed in an upstanding ring around the interior of the silo. Normally these knives 56 will not be attached to the disc 52 but when it is desired to loosen such a row of ensilage these auxiliary knives 56 are attached to the disc 52 in the apertures provided therefor as best shown in Fig. 4, and they extend outwardly a substantial distance beyond the circumferential periphery of the disc. Fig. 6 shows in greater detail the exact structure and angulation of these knives. We have found that these knives when so mounted are highly efficient in loosening and removing frozen ensilage from the inner walls of the silo. This is especially true when such a ring of a thickness of a foot or more has formed within the silo.

Prior to operation, the wheels 23 and 24 are adjusted by loosening the nuts which secure the upstanding pivot posts 25 and 26 and adjusting the wheel so that it will describe the desired arc and thereafter the nuts so that the machine will be tilted as desired. Ordinarily, the shaft 35 is tilted as shown in Fig. 3. The nuts are then tightened and the guide element 45 and the spacer element 51 are adjusted as desired. By sliding the shank 46 within the sleeve 31 the angle at which the disc 42 is disposed relative to horizontal position may be varied and in this way the extent to which the lower portion of the disc 42 will engage the ensilage may be readily varied. By slidably adjusting the shank 52 within the sleeve 27 the entire machine may be maintained in spaced relation from the inner walls of the silo as shown in Fig. 1, the spacer 51 serving at all times to maintain the device in spaced relation to the silo walls. The normal tendency of the device, of course, is to move away from the center of the silo, this being caused by the tilt of the disc 42 and its direction of rotation.

When the motor 40 is driven the disc 42 will be caused to rotate at a rapid rate and the cutter knives 44 will scarify and loosen the frozen surface of the ensilage quickly and efficiently. The carrier element 43 which follows immediately ahead of each set of cutter knives 44 engages the loosened ensilage and carries it outwardly relative to the center of the disc 42, flinging the same inwardly toward the center of the silo as they complete their arc of rotation. Since the disc 42 is tilted as shown in Fig. 3 the knives 44 and the carrier elements 43 carry ensilage only a relatively short portion of their arc of rotation and clean themselves during each rotation by flinging the ensilage therefrom. Thus it can be readily seen that a substantially less amount of power is required to drive the disc and to loosen the ensilage.

As the disc 42 rotates the machine is moved in the direction indicated by the arrow of Fig. 1 around the silo so that the scarifier assembly which is comprised of the disc 42, its shaft 35, the knives 44 and the carrier elements 43 is moved along an arc concentric with the inner wall surface of the silo until a complete rotation about the center of the silo has been made. By adjusting the spacer element 51 a second complete circular path of a different diameter may be followed and the ensilage systematically and efficiently loosened along the path of movement of the machine. Thus it can be readily seen that it is possible by commencing adjacent the center portions of the silo and following concentric paths outwardly toward the inner silo walls, the entire surface of the ensilage may be scarified and loosened quickly and efficiently.

The depth to which the scarifier elements or knives 44 are to pierce the frozen ensilage may readily be adjusted through adjustment of the guide element 45. Since the disc 42 is tilted as shown in Fig. 3 to prevent filling up and to thereby utilize less power, the device will ordinarily tend to be urged laterally and outwardly relative to the center of the silo. The guide element 45, however, acts as a stabilizer and positively prevents any twisting of the machine about a vertical axis which might otherwise occur because otherwise the rotation of the knives and their engagement of the packed ensilage would tend to rotate or twist the machine about the point at which the ensilage is engaged by the knives.

It should be noted that the entire device is tiltable about a horizontal axis by merely depressing the handle member 10 so that if it is ever desired the entire scarifier assembly may be readily cleared relative to the surface of the ensilage.

When it is desired to loosen an upstanding row of frozen ensilage the outwardly extending knives 56 are affixed to the disc in the apertures provided therefor and they will extend outwardly beyond the circumferential periphery of the disc as best shown in Fig. 4. By moving the machine closely adjacent to the upstanding row of frozen ensilage the knives 56 quickly scarify and loosen such frozen ensilage and remove the same from the inner walls of the silo, thus eliminating substantial wasteage and inconvenience.

Thus it can be seen that we have provided an ensilage loosener capable of being manufactured cheaply and simply and capable of simple operation and adjustment. It will be readily understood that a substantial saving in power is effected through the unique construction and operation of our device and that an improved machine has been provided which makes it possible to systematically loosen tthe frozen surface of the ensilage within a silo with a minimum of time and effort and at a minimum in cost.

It should also be noted that our device is stable and that the operator is at all times capable of moving the device along a predetermined arc so that the machine is at all times under his control. At no time during operation will the device be moving across an area not desired to be traversed by the operator because of inability on the part of the operator to be able to guide it properly.

It will, of course, be understood that various changes may be made in the form, details, arrangements and proportions of the various parts without departing from the scope of our invention.

What is claimed is:

1. An ensilage loosener comprising an ambulant frame, a pair of front wheels supporting and disposed on opposite sides of said frame, a scarifying member mounted on said frame rearwardly of said front wheels, means for driving said scarifying member, a rearwardly extending elongate member, a rearwardly and downwardly extending guide member mounted on said frame and guidably receiving a portion of said elongate member, a rear wheel mounted on said elongate member rearwardly of said scarifying member, and means releasably securing said elongate member to said guide member for shifting said elongate member longitudinally of the guide member to move said rear wheel toward and away from the front wheels and correspondingly lower and raise said scarifying member to vary the depth of penetration thereof, said scarifying member including an upstanding drive shaft, and depending cutters mounted on the lower end of said shaft, and said front and rear wheels supporting the frame so that said cutters rotate in a forwardly and upwardly extending plane to engage and loosen silage only during a portion of their arc of rotation.

2. The ensilage loosener as defined in and by claim 1 wherein a spacer element is mounted on said frame in laterally extending relation thereto, and a wall engaging wheel carried at the outer end of said spacer element.

3. The ensilage loosener as defined in and by claim 1 wherein means is provided for tilting said frame about its longitudinal axis.

4. The ensilage loosener as defined in and by claim 1 wherein said frame includes a pair of rearwardly convergent side legs, and an upright sleeve secured between the rearward ends of said side legs, said sleeve rotatably receiving said drive shaft, and said scarifying member including a disc secured to the lower end of said drive shaft and disposed in a plane perpendicular thereto and from the lower surface of which said cutters depend.

References Cited in the file of this patent

UNITED STATES PATENTS

| | | |
|---|---|---|
| 108,248 | Gard | Oct. 11, 1870 |
| 1,033,854 | Wenk | July 30, 1912 |
| 1,249,332 | Cline | Dec. 11, 1917 |
| 1,291,812 | Engel | Jan. 21, 1919 |
| 1,467,430 | Hurd | Sept. 11, 1923 |
| 1,550,102 | Schlueter | Aug. 18, 1925 |
| 1,647,066 | Westman | Oct. 25, 1927 |
| 1,904,138 | Hasson et al. | Apr. 18, 1933 |
| 2,051,443 | Gravely | Aug. 18, 1936 |
| 2,097,806 | Weidrich | Nov. 2, 1937 |
| 2,114,096 | Noel | Apr. 12, 1938 |
| 2,242,229 | Burleigh | May 20, 1941 |
| 2,410,273 | Deubner | Oct. 29, 1946 |
| 2,480,922 | Harshman | Sept. 6, 1949 |
| 2,485,729 | Gentry | Oct. 25, 1949 |
| 2,504,259 | Ford | Apr. 18, 1950 |
| 2,519,749 | Edwards | Aug. 22, 1950 |
| 2,552,951 | Freeman | May 15, 1951 |
| 2,554,061 | Sandberg | May 22, 1951 |
| 2,566,641 | Snead | Sept. 4, 1951 |
| 2,603,919 | Robinson | July 22, 1952 |
| 2,632,990 | Stricklen et al. | Mar. 31, 1953 |

FOREIGN PATENTS

| | | |
|---|---|---|
| 694,395 | France | Sept. 15, 1930 |
| 256,408 | Switzerland | Aug. 31, 1948 |